United States Patent [19]
Taylor

[11] Patent Number: 6,038,807
[45] Date of Patent: *Mar. 21, 2000

[54] UNDERWATER FISHING LINE CUTTER

[76] Inventor: Michael A. Taylor, R.R. 2, Box 198, Council Bluffs, Iowa 51503

[*] Notice: This patent is subject to a terminal disclaimer.

[21] Appl. No.: 08/267,823

[22] Filed: Jun. 28, 1994

[51] Int. Cl.⁷ ..................................................... A01K 97/00
[52] U.S. Cl. ...................... 43/17.2; 30/296.1; 114/221 A; 43/4
[58] Field of Search ............................ 43/17.2, 1, 4, 44.9, 43/44.91; 30/296.1; 114/221 A; 83/386

[56] References Cited

U.S. PATENT DOCUMENTS

| | | | |
|---|---|---|---|
| 488,847 | 12/1892 | Squires et al. | 43/17.2 |
| 756,760 | 4/1904 | Wolf | 114/221 A |
| 893,173 | 7/1908 | Kunze | 114/221 A |

*Primary Examiner*—Kurt Rowan
*Attorney, Agent, or Firm*—Koley, Jessen, Daubman & Rupiper P.C.; Mark D. Frederiksen

[57] ABSTRACT

An underwater fishing line cutter includes a housing with forward and rearward sections and a slot extending along the side thereof. A line support is mounted in each forward and rearward section of the slot, and a cutter carrier is mounted within the hollow interior of the housing. A control line is connected to the cutter carrier such that a rearward pull on the control line will move the cutting edge to sever a fishline journaled within the slot.

4 Claims, 2 Drawing Sheets

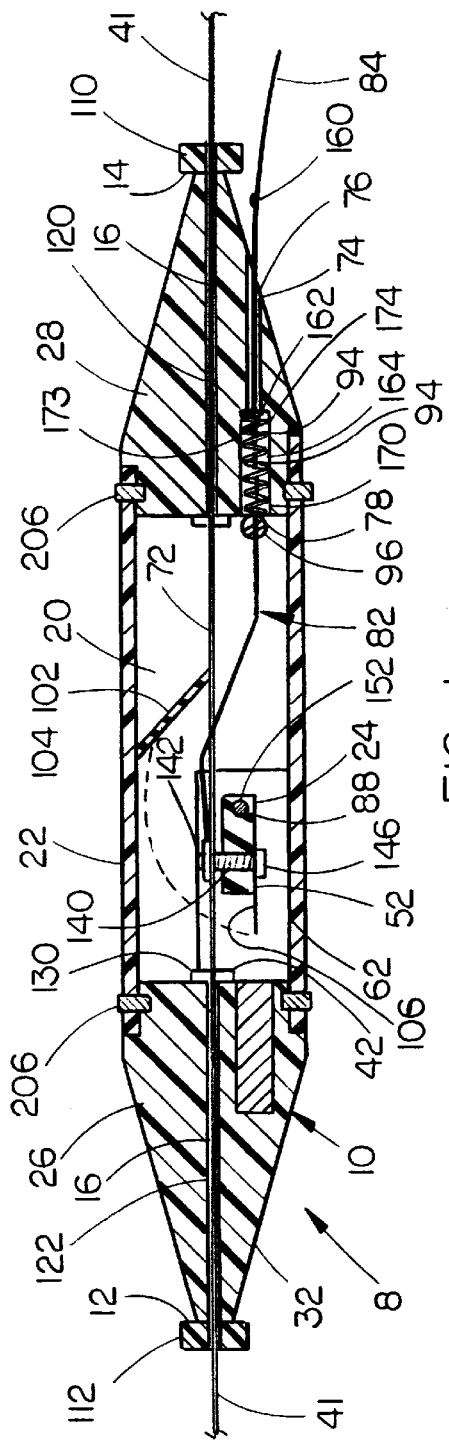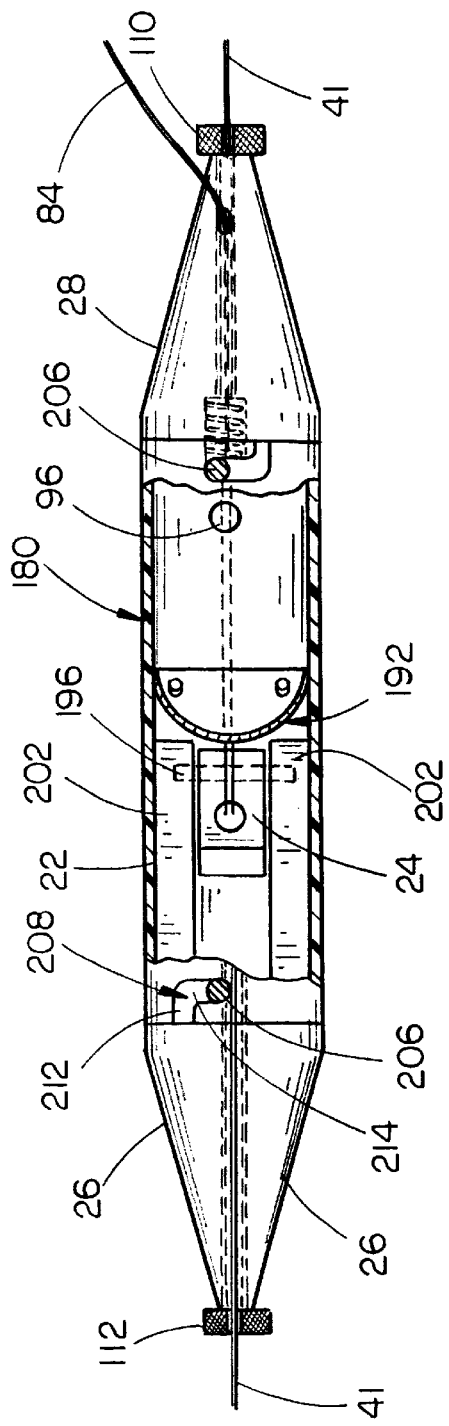

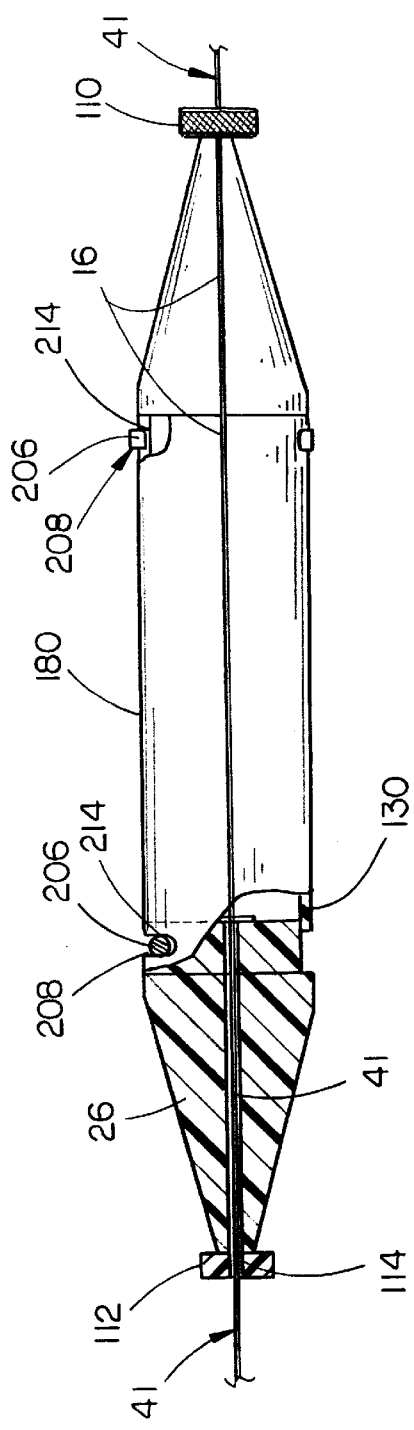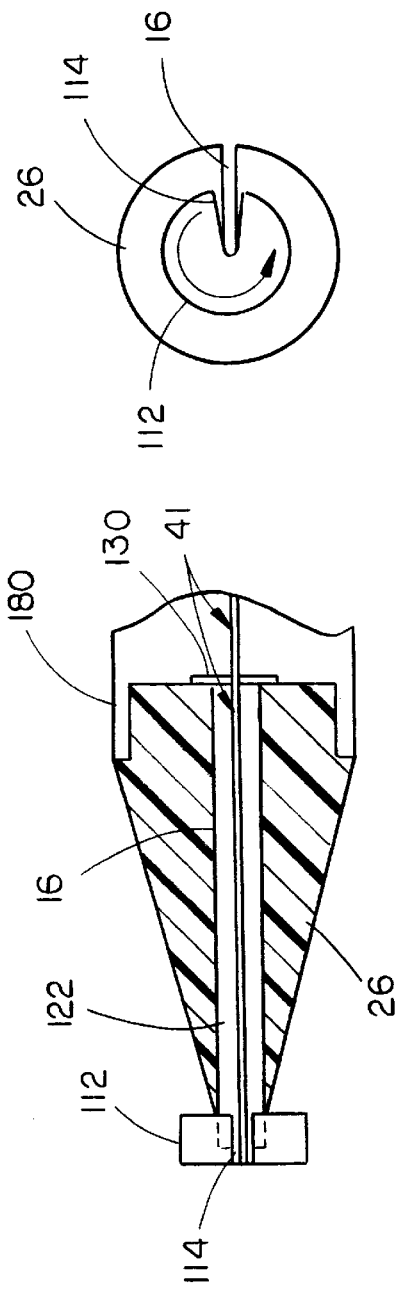
FIG. 3
FIG. 5
FIG. 4

UNDERWATER FISHING LINE CUTTER

FIELD OF THE INVETION

This invention is in the field of devices for cutting fishlines above a lure after the lure has been unreleasably snagged.

BACKGROUND

The following patents are believed to show the state of the prior art:

| | | |
|---|---|---|
| 893,173 | H. A. Kunze | July 14, 1908 |
| 2,560,723 | L. J. Hansen | July 17, 1951 |
| 2,968,112 | R. E. McClure | January 17, 1961 |
| 2,593,716 | R. E. Allen | November 7, 1950 |
| 3,802,110 | Jean-Claude Guillemain | April 19, 1974 |
| 4,908,974 | Jonathan B. Orlick | March 20, 1990 |
| 4,986,022 | James D. Wilkinson | January 22, 1991 |

In this field the earlier ways proposed have had many disadvantages. A first and important need is for the line cutter to be itself substantially unsnaggable. Where snags catch lures there are usually snags to catch a line cutter. Tree branches, seaweed and underwater logs and debris are common.

The loss of a snagged lure is often inevitable, but the loss of a line is preventable. Yet it is preventable only when the line cutter doesn't itself become snagged and trapped by debris and become unretrievable.

Samples of devices that would seem to snag are found in the patents to the Kunze, Hansen, the McClure, Guillemain, and to some degree Allen and Orlick.

A second and important prior art problem has been an outer shape for such a line cutter as to cause the line cutter to flutter on its way down a fishing line, this causes a binding against the line, hindering passage down the fishline.

An example of such a disadvantageous line-binding shape can be found in the U.S. Pat. No. 2,968,112, issued to Robert E. McClure. Some patents have no line with which to retrieve the cutter, examples are patents to McClure, Guillemain, Orlick and Wilkinson.

Examples of expensive ways are found in the patents to McClure, Guillemain, and Orlick. Some of the prior art devices are not line cutters. Examples are in the Hansen and Wilkinson patents.

The Wilkinson device shows a very streamlined, snag free shape. But in Wilkinson's there is no line-cutting; it is a hook-ram. It would be unretrievable itself, just as the line would be unretrievable by means of it, if it did not happen to ram the hook hard enough to loosen it. It would seem to be on a principle only for hooks and not for plugs.

OBJECTIVES

An objective is to provide a cutter that is streamlined in its shape tapered sufficiently on its forward side as to pass through seaweed, tree branches, and the like, and also streamlined on its rearward side sufficient to pass through the same on its way back up to the boat.

Another objective is to provide a housing shape that prevents a fluttering of the unit on its way down the line to the lure so it falls down freely and swiftly.

A particular objective is to provide a line cutter that has economy to its design.

An objective is to provide a cutter housing having a slot in it to receive fishing line and that has locks at each end of the housing designed, first, to receive fishing line, and then be rotated into a position for locking the line into the slot although the locking leaves the line free to permit the cutter to slide lengthwise with the line.

An objective is to provide a cutting and control assembly involving a control line which, when pulled, will cause a cutting assembly to cut the fish line, and so that, when the control line is released, a spring will cause a stiff connector to urge the cutter into a retracted position so that it cannot accidentally cut the fish line while the cutter is sliding down the fish line to the lure.

Another object is to provide an anvil in the housing having a receiving surface adapted to receive engagement by the cutting edge of the cutting assembly so that the line is cut by pressure from two sides.

Another objective is to provide a housing having three parts: two solid parts being at the forward and rearward ends of the housing, with the center of the housing being hollow for receiving the cutting assembly.

One of the solid ends of the housing is easily disconnected from the hollow center section of the housing for cleaning and maintenance, if necessary.

It is very important that the cutter slide freely down the line from the boat to the snagged lure. There is a danger that the blade of the cutter may unwantingly engage and cut the line while the cutter is descending.

Durability is important. If any single part fails, the cutter becomes useless until it is repaired.

It is important that the cutter stay on the line to be cut. If it should come off the cutter would no longer be in the cutting position.

More overall economy has been needed, so as to benefit those families whose money, budgetable for fishing equipment, is limited.

BRIEF DESCRIPTION OF THE DRAWINGS

FIG. 1 is a vertical sectional view taken through the longitudinal axis of the fishing line cutter;

FIG. 2 is a top plan view with the central portion shown in section;

FIG. 3 is a side elevational view of the cutter, with the forward end shown in sectional view and the body twisted to lock the forward end with the central body portion;

FIG. 4 is an enlarged sectional view of the forward end of the cutter; and

FIG. 5 is a front elevational view of the cutter.

DESCRIPTION OF THE PREFERRED EMBODIMENT

The underwater fishing line cutter hereof is generally shown at 8 in FIG. 1 and has a housing 10 having a forward end 12 and a rearward end 14. The housing 10 has a slot 16 extending from one side thereof and extending from the forward end 12 of the housing 10 to the rearward end 14 thereof.

The housing 10 is hollow and has a cutting chamber 20 with a wall 22 enclosing a cutter carrier 24. The housing 10 has a forward structure 26 through which the forward section 32 of the slot 16 extends. The housing 10 has a rearward structure 28 through which the rearward section 34 of the slot 16 extends. The cutting chamber 20 is located between the structures 26 and 28.

The slot 16 extends through the forward structure 26 and the rearward structure 28.

There is a forward line support point 42 on the forward structure 26 in the chamber 20. There is a rearward line support point 44 in the chamber 20 at the forward end of the rearward slot section 34.

A fishing line 41, to be cut, can extend between the points 42 and 44. The line 41 will then be supported by the forward structure 26 and the rearward structure 28.

A cutter 52, mounted on the carrier 24, has a cutting edge 62 protruding from the carrier 24.

When the carrier 24 is caused to move in a cutting direction, the edge 62 will pass across a straight position-line 72 between the forward support point 42 and the rearward support point 44.

The straight position-line 72 will normally be the position of the fishing line 41.

The rearward structure has a passage 74 therethrough having an entrance point 76 and an exit point 78. The entrance point 76 and exit point 78 are rearwardly and forwardly of each other respectively.

A control assembly 82 has a flexible control line 84 and a stiff connector 86. The stiff connector 86 is disposed forwardly of the control line 84. The stiff connector 86 and the cutter carrier 24 are positioned and shaped so that when the control line 84 is pulled rearwardly, the cutting edge 62 will move across the straight position-line 72.

A spring assembly 92 is mounted on the housing 10 and is inter-correlated between the stiff connector 86 and the carrier 88 and the housing 10 in a manner such that whenever the control line 84 is not under tension, the spring assembly 92 and the stiff connector 86 will cause the carrier 88 to be urged into a starting position 106 that keeps the cutting edge 62 from contacting the fishing line 41, and keeps the edge 62 away from the fishing line 41 at the position-line 72.

In the chamber 20, an anvil 102 is attached to the cutting chamber wall 22. The anvil 102 has a receiving surface 104 adapted to receive engagement by the cutting edge 62.

The receiving surface 104 is on an opposite side of the position-line 72 from the starting position 106 of the cutting edge 62, whereby when the carrier 24 moves the cutting edge 62 transversely of the position-line 72, then the cutting edge 62 will tend to press the fishing line 41 toward the anvil 102 receiving surface 104.

The line cutter 8 has a rotating lock 110 at the rearward edge of the housing 10. A forward rotating lock 112 is located at the forward end of the housing 10. Tubes 120 and 122 rotatably connect the rotating locks 110 and 112 to the housing 10, and permit the locks 110 and 112 to rotate with respect to the position-line 72.

Each of the locks 110 and 112 have a lock-slot 114 therein capable of registry with the housing slot 16. The locks 110 and 112 are capable of being rotated into positions for blocking lateral movement of the fishing line 41, preventing respective adjacent parts, of the fishing line 41 from coming out of the housing slot 16.

Each tube 120 and 122 has an inner end 130 which is outwardly flared for holding the tubes 120 and 122 from moving outwardly of the housing 10.

A single eye-bolt 140 having an eye 142 connected to the stiff connector 86, and having a nut 146, is all that is necessary to attach the blade 52 to the carrier 24. An axil 88 connects the carrier 24 to the wall 22 in a manner permitting the carrier 24 to rotate about an axis 152 which is at a right angle to the position-line 72.

In FIG. 1, the stiff connector 86 is connected to the control line 84 by a suitable connection 160. A stop 96 is fixed to the stiff connector 86 in a position at the forward end 170 of a spring 162. The rearward end 172 of the spring 162 is received in a socket 174 which later is an enlargement of the forward end of the passage 74.

The stop 96 is urged toward the carrier 24 by the spring 162 for causing the carrier 24 to keep the blade 52 safely away from the line cutting position at times when the control line 84 is relaxed.

The anvil 102 is substantially semi-circular shaped, but in any case of the shape for having its curved outer surface 192 against the inner side of the wall 22.

In FIG. 2 can be seen the axil 196 about which the carrier 24 pivots. This axil 196 is received in bearings 202 at each of its ends. The bearing 202 are pieces of plastic fixed to the wall 22.

The central housing section 180 is fixed to the rearward structure 28, but has slidable and movable connection with the forward structure 26. A pin 206 protruding out from the forward structure 26 in FIG. 2 is receivable in a L-shape slot 208 in the central housing section 180.

When the forward structure 26 is inserted rearwardly into central housing section 180, the pin 206 is received into a longitudinal portion 212 of the slot 208. Thereafter twisting of the forward structure 26 with respect with the central housing portion 180 will cause the pin 206 to pass into an end of a transverse portion 214 of the slot 208.

TESTS

TEST GROUP I

These first testings of the cutter thereof showed that when made without a strike-plate to engage the side of the line from the blade, about 50% of the time, there would be no cutting. Apparently this is because the blade slips along the line without cutting-in enough.

TEST GROUP II

Tests were then made of the cutter hereof with a strike-plate, but with the blade on the same side of the blade-carrier as the line to be cut. These tests showed that, about 10% of the time, the line was not cut.

TEST GROUP III

Tests were also made of the cutter hereof, substantially as shown herein, with the blade on the opposite side of the blade-carrier from the line to be cut. In these tests the line was cut every time, 100% of the time. Success may be caused by two factors: (1) the blade was approaching the line at a greater angle and hence was also likely to slide along the line; (2) the blade-carrier touches the line before the blade does and puts extra tension on the line just before the blade engages the line.

In each test group, lines of a variety of different lengths were used between 10 feet and 50 feet long. The length of the lines seemed to make no difference.

I claim:

1. An underwater fishing line cutter comprising:
   a housing having a forward end and a rearward end, said housing having a slot therein for receiving a fishline to be cut;
   said slot extending into said housing along one side thereof and extending from said forward end of said housing to said rearward end thereof;

said housing being hollow and having a cutting chamber therein, the cutting chamber having a wall;

a cutter carrier in said chamber;

said housing having a forward structure through which a forward section of said slot extends, said housing having a rearward structure through which a rearward section of said slot extends;

said chamber being located between said forward and rearward structures;

said slot having a forward section extending through said forward structure and a rearward section extending through said rearward structure, there being a forward line support point in said forward section of said forward structure and a rearward line support point in said rearward section of said rearward structure, whereby a fishline to be cut can extend between said points and will be supported by said forward structure and by said rearward structure;

a cutter mounted on a carrier and having a cutting edge protruding from said carrier whereby, when said carrier is caused to move in a cutting direction, said edge will pass across a straight position-line between said forward and rearward support points, said straight position-line being normally the position of a fishline;

said rearward structure having a passage therethrough having an entrance point and an exit point, said entrance and exit points being rearwardly and forwardly of each other respectively;

a control means comprising a flexible control line and a stiff connectors, said stiff connector being disposed forwardly of said control line;

said stiff connector being connected to said carrier in a manner such that when said control line is pulled rearwardly said cutting edge will move across said straight position-line for engaging a fishline on said position-line;

a spring assembly mounted on said housing and intercorrelated between said stiff connector and said housing in a manner such that whenever said control line is not under tension said spring and said stiff connector will cause said carrier to be urged into a position which keeps the said cutting edge in a starting position out of contact with a line to be cut by keeping said edge away from said position-line.

2. The line cutter of claim 1 having an anvil with a receiving surface adapted to receive engagement by said cutting edge;

said receiving surface being on an opposite side of said position-line from said starting position of said cutting edge, whereby when said carrier moves said cutting edge transversely of said position-line, then said cutting edge will tend to press a fishline in said cutter housing toward said anvil receiving surface.

3. The line cutter of claim 2 having a rotating lock at the rearward edge of said housing and another rotating lock at the forward end of said housing;

means rotatably connecting said rotating locks to said housing;

said lock connection means permitting said locks to rotate with respect to said position-line;

each of said locks having a lock-slot therein capable of registry with said housing slot;

said locks being capable of being rotated into positions for blocking an adjacent part of a fishline in said housing slot from coming out of said housing slot.

4. The line cutter of claim 1 having a rotating lock at the rearward edge of said housing and another rotating lock at the forward end of said housing;

means rotatably connecting said rotating locks to said housing;

said lock connection means permitting said locks to rotate with respect to said position-line;

each of said locks having a lock-slot therein capable of registry with said housing slot;

said locks having capable of being rotated into positions for blocking an adjacent part of a fishline in said housing slot from coming out of said housing slot.

* * * * *